United States Patent [19]

Want et al.

[11] 4,304,155
[45] Dec. 8, 1981

[54] POWER SHIFT TRANSMISSIONS

[75] Inventors: Denis V. J. Want, Dudley; Norman Schofield, Wolverhampton; Richard Gibbens, Sutton Coldfield, all of England

[73] Assignee: Brockhouse Transmissions, Ltd., England

[21] Appl. No.: 78,187

[22] Filed: Sep. 24, 1979

Related U.S. Application Data

[63] Continuation of Ser. No. 780,263, Mar. 23, 1977, abandoned.

[30] Foreign Application Priority Data

Mar. 25, 1976 [GB] United Kingdom ............... 11949/76

[51] Int. Cl.³ .................... B60K 41/16; F16H 47/00; F16D 67/00
[52] U.S. Cl. ........................ 74/866; 74/360; 74/365; 74/336 R; 74/731; 74/732; 192/3.52; 192/3.57; 192/48.8; 192/87.16
[58] Field of Search .............. 74/360, 365, 336 R, 74/731, 732, 866; 192/3.52, 3.57, 48.8, 87.17, 87.16, 87.14

[56] References Cited

U.S. PATENT DOCUMENTS

| | | | |
|---|---|---|---|
| 1,708,329 | 4/1929 | Roberts | 192/3.52 |
| 2,742,986 | 4/1956 | Nallinger | 74/365 X |
| 2,956,444 | 10/1960 | Bensinger et al. | 74/365 X |
| 3,003,608 | 10/1961 | Biraben | 192/3.57 X |
| 3,181,385 | 5/1965 | Siler | 74/360 X |
| 3,254,541 | 6/1966 | Schou | 74/360 |
| 3,335,830 | 8/1967 | Castelet | 192/0.092 |
| 3,339,672 | 9/1967 | Crandall | 192/87.13 X |
| 3,425,293 | 2/1969 | Krawczyk et al. | 74/360 |
| 3,438,469 | 4/1969 | Hilpert | 192/3.57 |
| 3,465,609 | 9/1969 | Fisher et al. | 74/360 |
| 3,625,080 | 12/1971 | Rachel et al. | 74/336 |
| 3,673,400 | 6/1972 | Ito | 74/731 |
| 3,682,019 | 8/1972 | Hoyer et al. | 74/745 |
| 3,732,753 | 5/1973 | Olsen et al. | 74/866 |
| 3,736,806 | 6/1973 | Banks | 74/336 |
| 3,738,193 | 6/1973 | Sumiyoshi et al. | 74/866 |
| 3,805,640 | 4/1974 | Schneider et al. | 74/645 |
| 3,886,815 | 6/1975 | Eastwood | 74/745 |
| 3,893,345 | 7/1975 | Sisson et al. | 74/331 |
| 3,913,411 | 10/1975 | Jameson | 74/360 |
| 3,942,393 | 3/1976 | Forster et al. | 74/866 |
| 4,004,417 | 1/1977 | Woody et al. | 192/3.57 |
| 4,023,443 | 5/1977 | Usui et al. | 74/866 |
| 4,107,776 | 8/1978 | Beale | 74/866 X |

FOREIGN PATENT DOCUMENTS

1102570 3/1961 Fed. Rep. of Germany ....... 74/15.4

Primary Examiner—Leslie Braun
Attorney, Agent, or Firm—Merriam, Marshall & Bicknell

[57] ABSTRACT

A transmission comprising a torque convertor and a power shift gear box having rotatable input and output shafts, multi-ratio drive means to produce different speeds of rotation of the output shaft relative to the input shaft, said drive means including gears which are in constant mesh and clutches, which are engageable and disengageable under load, to connect the gears in a desired drive path, control means for operating the clutches of the multi-ratio drive means to change the ratio of the gear box in dependence upon an electrical signal derived from rotation of a first element associated with the torque convertor input shaft and of a second element associated with an intermediate shaft upstream of the multi-ratio drive means and downstream of a variable torque capacity clutch located between the torque convertor output shaft and the multi-ratio drive means.

7 Claims, 2 Drawing Figures

POWER SHIFT TRANSMISSIONS

This is a continuation of application Ser. No. 780,263, filed Mar. 23, 1977, now abandoned.

BACKGROUND OF THE INVENTION

1. Field of the Invention

This invention relates to transmissions herein referred to as the type described comprising a torque convertor and a power shift gear box having rotatable input and output shafts, multi-ratio drive means to produce different speeds of rotation of the output shaft relative to the input shaft, said drive means including gears which are in constant mesh and clutches, which are engageable and disengageable under load, to connect the gears in a desired drive path.

A transmission of the type described may comprise an epicyclic gear box or a lay-shaft gear box and may include a forward and reverse drive means to produce forward or reverse rotation of the output shaft relative to the input shaft.

SUMMARY OF THE INVENTION

An object of the present invention is to provide a new and improved transmission of the type described.

According to the present invention we provide a transmission of the type described having control means for operating the clutches of the multi-ratio drive means to change the ratio of the gear box in dependence upon an electrical signal derived from rotation of a first element associated with the torque convertor input shaft and of a second element associated with an intermediate shaft upstream of the multi ratio drive means and downstream of a variable torque capacity clutch located between the torque convertor out-put shaft and the multi ratio drive means.

The variable torque capacity clutch may be associated with a forward and reverse drive means.

The forward and reverse drive means may provide the same speed of rotation of the output shaft relative to the input shaft in forward and in reverse.

Alternatively the forward and reverse drive means may provide a different speed of rotation of the output shaft compared with the input shaft in forward and in reverse, there being means to provide a further signal to the control means to indicate whether the forward gear or the reverse gear is engaged and the control means when receiving said further signal being arranged to allow for the difference in speed of rotation so that the ratio is changed at the same effective relationship between the speeds of rotation of the first and second elements in forward gear as in reverse gear.

The control means may operate the clutches solely in dependence upon said electrical signal or said electrical signal and said further signal.

In the specification the term "variable torque capacity clutch" is intended to refer to a clutch which permits different speeds of rotation of the input and output shafts with the clutch partially engaged. Such a clutch is operated manually either, to provide an infinitely variable reduction in torque transmittal capacity, or means may be provided whereby a predetermined reduction in torque transmittal capacity to one or more levels is arranged under the manual control of an operator. The clutch may be operated, under manual control, mechanically, pneumatically or hydraulically.

Because a transmission embodying the present invention incorporates the variable torque capacity clutch, when the transmission is operated with the clutch slipping then if the ratio changing was dependent upon a means sensing the torque convertor input to output speed ratio the sensing means would sense a condition which apparently required that the ratio should be changed upwardly. It is for this reason that it is necessary to sense the torque convertor "output" speed downstream of the variable torque capacity clutch so as to take into account the actual operating conditions of the transmission.

BRIEF DESCRIPTION OF THE DRAWINGS

The invention will now be described in more detail by way of example with reference to the accompanying drawings wherein.

DESCRIPTION OF THE PREFERRED EMBODIMENT

Figure 1:
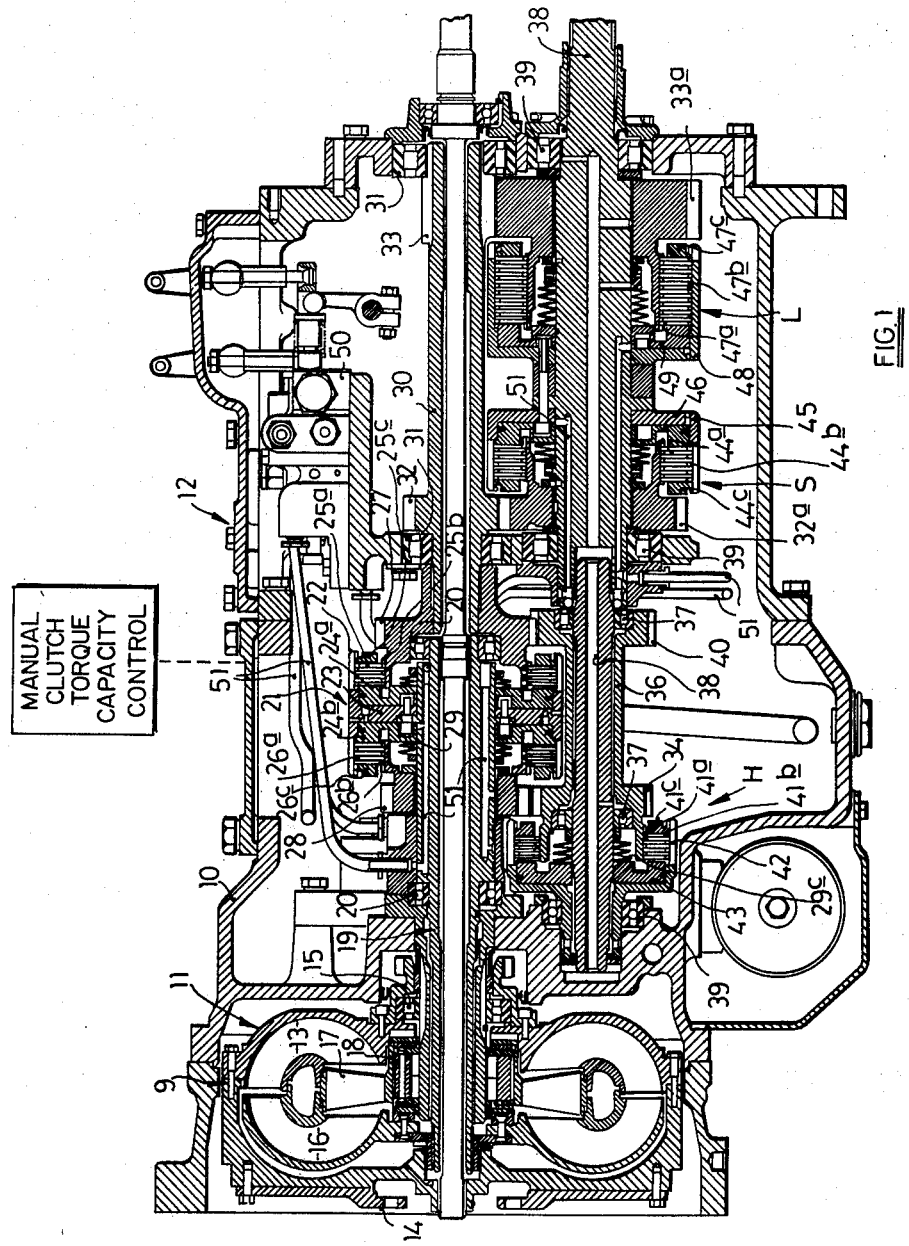
FIG. 1 is a longitudinal cross sectional view through a transmission embodying the invention.

Referring to the drawings there is illustrated a transmission comprising a casing 10 within which is provided a torque convertor 11 and a power shift gear box 12.

The torque convertor 11 is of generally conventional form consisting of the usual annular hollow two-part shell 9. The half of the shell which is more remote from the engine comprises a vaned impellor 13, and the shell 9 is driven by a driving member 14 connected to the engine of the vehicle and mounted on a bearing 15.

In the other half of the shell 9, that is the half nearer to the engine, there is mounted a vaned turbine 16 of the torque convertor. The impellor 13 and the turbine 16 constitute torque transmission elements through which the torque is transmitted. Disposed at the inner periphery of the path of the fluid within the convertor is a vaned reaction element 17 which is held against rotation under torque conversion conditions by a suitable conventional overrunning device 18.

The turbine 16 of the convertor is carried upon one end of an output shaft 19 which extends through the impellor 13 and is rotatably mounted on bearings 20.

The output shaft 19 constitutes an input shaft to the power shift gear box 12 and carries a duplex hydraulically operated variable torque capacity clutch 21 of a forward and reverse drive means. The clutch 21 comprises a drum 22 connected by a median web 23 for rotation with the shaft 19 and slidably mounted within the drum 22 are a pair of pistons 24a, 24b. Each piston 24a, 24b is adapted respectively to act on sets of clutch plates 25a, 25b and 26a, 26b respectively.

The clutch plates 25a are keyed to the drum 22 whilst the clutch plates 25b are keyed to a gear 27. The clutch plates 26a are keyed to the drum 22 and the clutch plates 26b to a gear 28.

In use, the piston 24a can be urged by hydraulic fluid to the right in FIG. 1 to compress the clutch plates 25a and b together and against a stop member 25c so as to connect the gear 27 to the drum 22.

Alternatively, the piston 24b can be operated to urge the clutch plates 26a and b together and against a stop member 26c to connect the gear 28 to the drum 22.

In both cases the torque capacity of the clutch can be varied by clutch torque capacity control 55, which operates, under the manual control of an operator, in any conventional manner, e.g., by varying the pressure of the hydraulic fluid which actuates clutch plates 25 or 26, thus permitting partial slipping between the plates when the torque demand exceeds the clutch capacity. For example, to permit inching of a fork lift truck in which the transmission is installed. In such a case the power provided by the prime mover and not required for drive during inching can be utilised for raising a load on the fork arms of the truck.

Belleville springs 29 are provided normally to maintain the pistons 24a and 24b out of drive transmitting engagement with the clutch plates.

The gear 27 is rotatably mounted relative to the shaft 19 by the bearing 20 and is keyed to an intermediate shaft 30 rotatably mounted in bearings 31. The intermediate shaft 30 carries a second gear pinion 32 and a low gear pinion 33.

The gear 28 is rotatably mounted on the shaft 19 and meshes with an idler gear, not shown, which meshes with a "high" gear 34 carried on a lay shaft 36 rotatably mounted in bearings 37 within which is carried an output shaft 38 itself rotatably mounted in bearings 39. The lay shaft 36 carries a pinion 40 which meshes with the pinion 27.

Associated with the "high" gear 34 is a clutch H of a high gear ratio drive means to alternate clutch plates 41a of which the lay shaft 36 is keyed. The interposed clutch plates 41b are keyed to the drum 42 of the clutch H whilst the drum 42 is keyed to the output shaft 38. In use, hydraulic fluid under pressure acts to bias a piston 43 of the clutch to the right in FIG. 1 to urge the clutch plates 41a and b together and against a stop member 41c, thus to connect the lay shaft 36 to the drum 42 and hence to the output shaft 38. Belleville springs 29c are provided normally to maintain the plates 41a and b out of drive transmitting engagement.

The "second" gear 32 meshes with a gear 32a which is associated with a clutch S of a second gear ratio drive means to alternate clutch plates 44a of which the gear 32a is keyed whilst the interposed clutch plates 44b are keyed to the drum 45 of the clutch S. The drum 45 is fixed to the output shaft 38 for rotation therewith.

In use, hydraulic fluid under pressure acts to bias a piston 46 to the left in FIG. 1 to urge the clutch plates 44a and b together and against a stop member 44c to connect the gear 32a to the drum 45 and hence to the output shaft 38.

The "low" gear 33 meshes with a gear 33a which is associated with a clutch L of a low gear ratio drive means to alternate clutch plates 47a of which the gear 33a is keyed, whilst the interposed clutch plates 47b are keyed to the drum 48 of the clutch. The drum 48 is fixed to the output shaft 38 for rotation therewith. In use, a piston 49 is urged by hydraulic fluid to the right, in FIG. 1, to urge the clutch plates 47a and b together and against a member 47c to connect the gear 33a to the drum 48 and hence to the output shaft 38. Belleville springs are provided in the clutches S and L as in Clutch H.

In the transmission shown in FIG. 1 hydraulic fluid is fed to the clutch 21 of the forward and reverse drive means and the clutches H, S and L of the three speed ratio drive means from a valve block 50 through appropriate conduits 51, in conventional manner.

When the piston 24a of the forward and reverse clutch 21 is actuated the gear 27 is locked to the shaft 19 and thus drives the intermediate shaft 30, and the lay shaft 36 through the gears 27 and 40. The output shaft 38 is rotated depending upon which of the high gear, second gear or low gear clutches H, S or L are actuated. If the high gear clutch H is actuated then the output shaft 38 is driven from the lay shaft through the clutch H. If the second gear clutch S is actuated the output shaft 38 is driven through the gears 32a and 32 and the clutch S whilst if the low gear clutch L is actuated the output shaft 38 is driven through the gears 33, 33a and the clutch L.

When the piston 24b is actuated the gear 28 is locked to the shaft 19 and the lay shaft 36 is driven through the idler gear in the reverse direction to that obtained with piston 24a actuated. Thus the gear 27 is rotated, in said reverse direction, through the meshing of the gears 40 and 27 and hence the intermediate shaft 30 is rotated in said reverse direction.

The output shaft 38 can be rotated, in said reverse direction, at any one of the three desired speeds depending upon whether the high gear, second gear or low gear clutch is engaged.

Figure 2:
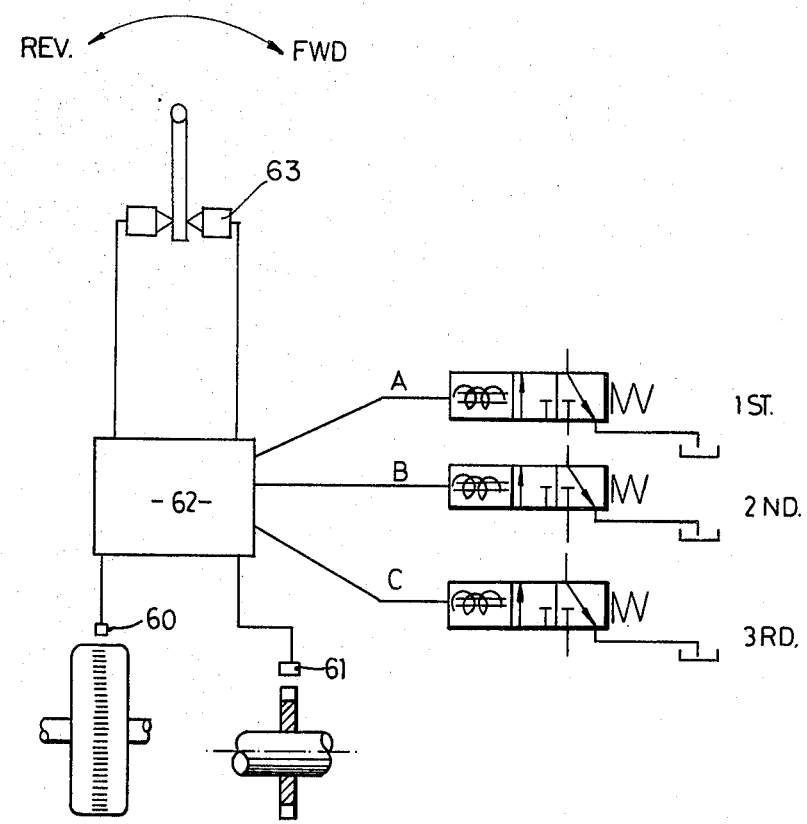
FIG. 2 is a diagrammatic representation of the control system of the transmission of FIG. 1.

Referring particularly to FIG. 2, a suitable transducer device 60 is provided in association with the input member 14 of the torque convertor to sense its speed of rotation as well as a transducer 61 provided in association with the intermediate shaft 30 to sense its speed of rotation. The signals are fed to a control means 62 where the ratio of the speed of rotation of the intermediate shaft to the torque convertor input shaft is ascertained.

When the transmission is in first gear an electrical signal is fed via line A to a solenoid operated valve of the valve block 50 to feed hydraulic fluid to the appropriate clutches to engage first gear. As the ratio attains a predetermined value, hereinafter referred to as the change up ratio, lying in the range 0.85–0.94, for example 0.9, the electrical signal is changed from line A to line B and hence the valve block 50 feeds hydraulic fluid to the appropriate clutches to cause a ratio to increase from low gear to a second gear. After the ratio has been thus changed and the ratio of the intermediate shaft to the input shaft speed again reaches the predetermined value the electrical signal is changed from line B to line C to cause the valve block 50 to feed hydraulic fluid to the appropriate clutches to cause ratio change from second gear to high gear.

When in any gear except low gear, the ratio of the speed of rotation of the intermediate shaft to the torque convertor input shaft is below or falls to a predetermined value, hereinafter referred to as the change down ratio, electrical signals are fed via the appropriate lines A or B to the solenoid operated valves of the valve block 50 to feed hydraulic fluid to the appropriate clutches to cause ratio change to the next lowest gear.

The change down ratio is predetermined as being the product of said change up ratio and the gear step and a hysteresis factor. In this specification the term "gear step" means the lower numerical ratio divided by the higher numerical ratio of any successive gear pairs between which changes are made whilst the hysteresis factor is a figure, chosen empirically to ensure that gear shift hunting does not occur and may, for example, be about 0.8 to 0.9.

In the example described above the speeds of rotation in forward and reverse may be the same and thus no signal to control means 62 to indicate whether forward or reverse gear is engaged in required. However, if the forward and reverse clutch and gears are such as to give a different speed of rotation of the output shaft 38 for a given speed of rotation of the input shaft 19, means 63, shown in FIG. 2, is provided to furnish a further signal to control means 62 to indicate whether forward or reverse gear is engaged. Control means 62 when receiving such further signal is arranged to allow for the difference in speed of rotation, so that the ratio is changed at the same effective relationship between the speeds of rotation of the first and second elements in forward gear as in reverse gear.

Although in this example the transducers have been described as directly sensing the speed of rotation of the input and intermediate shafts they may sense the speed of rotation of any element which is associated therewith in the sense that it rotates therewith in a fixed speed ratio thereto.

We claim:

1. A transmission comprising a torque convertor having an input shaft and an output shaft,
   a power shift gear box having rotatable input and output shafts and multi-ratio drive means to produce different speeds of rotation of the output shaft relative to the input shaft, said drive means including gears which are in constant mesh and clutches, which are engageable and disengageable under load, to connect the gears in a desired drive path,
   a variable torque capacity clutch located between the torque convertor output shaft and the multi-ratio drive means,
   means under the manual control of an operator for controlling the instantaneous torque transmittal capacity of said clutch, and
   control means for operating the clutches of the multi-ratio drive means to change the ratio of the gear box in dependence upon an electrical signal derived from rotation of a first element associated with the torque convertor input shaft and of a second element associated with an intermediate shaft upstream of the multi-ratio drive means and downstream of said variable torque capacity clutch.

2. A transmission according to claim 1 wherein the variable torque capacity clutch is associated with a forward and reverse drive means.

3. A transmission according to claim 2 wherein the forward and reverse drive means provides the same speed of rotation of the output shaft relative to the input shaft in forward and in reverse.

4. A transmission according to claim 1 wherein the control means operates the clutches solely in dependence upon said electrical signal.

5. A transmission according to claim 1 further including transducers adapted to sense directly the speed of rotation of the input and intermediate shafts.

6. A transmission according to claim 5 wherein said transducers produce pulses the frequency of which is proportional to the speed of rotation of the associated elements.

7. A fork lift truck incorporating a transmission according to claim 1.

* * * * *